(12) United States Patent
Saleem et al.

(10) Patent No.: US 9,792,901 B1
(45) Date of Patent: Oct. 17, 2017

(54) MULTIPLE-SOURCE SPEECH DIALOG INPUT

(71) Applicant: Amazon Technologies, Inc., Seattle, WA (US)

(72) Inventors: Shirin Saleem, Belmont, MA (US); Aimee Therese Piercy, Mountain View, CA (US); Marcello Typrin, Menlo Park, CA (US); Shamitha Somashekar, Cupertino, CA (US); Kurt Wesley Piersol, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 14/567,416

(22) Filed: Dec. 11, 2014

(51) Int. Cl.
*G10L 15/22* (2006.01)
*B60R 16/037* (2006.01)
*G06F 3/16* (2006.01)
*G10L 15/08* (2006.01)
*G10L 17/22* (2013.01)

(52) U.S. Cl.
CPC .............. *G10L 15/08* (2013.01); *G10L 17/22* (2013.01); *B60R 16/0373* (2013.01); *G06F 3/167* (2013.01); *G10L 15/22* (2013.01)

(58) Field of Classification Search
CPC ..... G10L 15/22; G10L 25/90; B60R 16/0373; G06F 3/167
See application file for complete search history.

(56) References Cited

U.S. PATENT DOCUMENTS

| | | | |
|---|---|---|---|
| 6,230,138 B1 * | 5/2001 | Everhart | G10L 15/26 454/74 |
| 6,434,527 B1 * | 8/2002 | Horvitz | G10L 15/22 704/251 |
| 6,839,670 B1 * | 1/2005 | Stammler | G10L 15/063 704/251 |
| 6,975,993 B1 * | 12/2005 | Keiller | G10L 15/26 704/270.1 |
| 7,260,538 B2 * | 8/2007 | Calderone | H04N 5/45 348/14.05 |
| 7,457,755 B2 * | 11/2008 | Konig | B60R 16/0373 704/275 |
| 8,340,975 B1 * | 12/2012 | Rosenberger | G10L 15/22 704/270 |
| 8,825,020 B2 * | 9/2014 | Mozer | H04L 12/282 379/102.01 |
| 9,293,134 B1 * | 3/2016 | Saleem | |
| 2003/0093281 A1 * | 5/2003 | Geilhufe | G10L 13/00 704/275 |

(Continued)

*Primary Examiner* — Samuel G Neway
(74) *Attorney, Agent, or Firm* — Lee & Hayes, PLLC (57) ABSTRACT

A speech system may be configured to operate in conjunction with a stationary base device and a handheld remote device to receive voice commands from a user. A user may direct speech either to the base device or to the handheld device. In order to direct speech to the base device, the user first speaks a keyword. In order to direct speech to the handheld device, the user presses a talk control on the handheld device. A dialog may be conducted with the user in multiple turns, where each turn comprises user speech and a speech response by the speech system. The user speech in any given dialog turn may be provided from the base device and/or the handheld device.

22 Claims, 5 Drawing Sheets

(56) References Cited

U.S. PATENT DOCUMENTS

| | | | | |
|---|---|---|---|---|
| 2005/0267759 A1* | 12/2005 | Jeschke | G10L 15/22 | 704/270 |
| 2006/0014540 A1* | 1/2006 | Klein | H04W 4/10 | 455/445 |
| 2006/0247931 A1* | 11/2006 | Caskey | G10L 15/22 | 704/270 |
| 2007/0118380 A1* | 5/2007 | Konig | B60R 16/0373 | 704/270 |
| 2007/0244687 A1* | 10/2007 | Mizutani | G06F 17/289 | 704/1 |
| 2009/0076827 A1* | 3/2009 | Bulitta | | 704/275 |
| 2011/0242269 A1* | 10/2011 | Nothlings | H04N 5/45 | 348/14.05 |
| 2012/0173238 A1* | 7/2012 | Mickelsen | G10L 15/30 | 704/246 |
| 2012/0316871 A1* | 12/2012 | Koll | G10L 15/30 | 704/231 |
| 2013/0238326 A1* | 9/2013 | Kim | G06F 3/167 | 704/231 |
| 2014/0081631 A1* | 3/2014 | Zhu | G10L 21/0208 | 704/226 |
| 2014/0142934 A1* | 5/2014 | Kim | G10L 15/20 | 704/226 |
| 2014/0278438 A1* | 9/2014 | Hart | G06F 3/167 | 704/275 |
| 2014/0330560 A1* | 11/2014 | Venkatesha | G10L 15/22 | 704/235 |
| 2015/0039316 A1* | 2/2015 | Tzirkel-Hancock | G10L 15/22 | 704/275 |

* cited by examiner

MULTIPLE-SOURCE SPEECH DIALOG INPUT

BACKGROUND

As the processing power available to devices and associated support services continues to increase, it has become practical to interact with users in new ways. In particular, it has become practical to interact with users through two-way speech dialogs, in which user instructs a system by voice and the system responds by speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A speech-based system may be configured to interact with a user through speech to receive instructions from the user and to provide services for the user. The system may have a stationary base device and a portable, handheld remote device, each of which may have a microphone for producing audio containing user speech. The user may give instructions to the system by directing speech to either the base device or the handheld remote device.

Audio signals produced by the base device and the handheld device are provided to a speech service for automatic speech recognition (ASR) and natural language understanding (NLU) to determine and act upon user intents. The speech service is configured to respond to user speech by performing actions, providing services, and/or generating audio for playback by the base device.

In order to fully determine a user's intent when speaking, the system may engage in a speech dialog with the user. A dialog comprises a sequence of dialog turns. Each dialog turn comprises a user utterance and may also include a system-generated speech reply. The following is an example of a speech dialog that may take place between a speech-based system and a user:

Turn 1:
User: "Set a timer."
System: "For how long?"
Turn 2:
User: "Thirty minutes."
System: "Timer for thirty minutes starting now."

When using the handheld device to speak to the system, the user presses a push-to-talk button of the handheld device to indicate that he or she is directing speech to the system. When speaking to the base device, the user speaks a keyword in order to signal that he or she is intending subsequent speech to be interpreted as a command. Once the dialog has started using the base device, it is not necessary for the user to speak the keyword during a subsequent dialog turn. Instead, the system assumes that subsequent user speech is also part of the dialog.

When speaking to the base device, for example, a dialog may comprise the following:
Turn 1:
User: "Alexa, set a timer."
System: "For how long?"
Turn 2:
User: "Thirty minutes."
System: "Timer for thirty minutes starting now."
where "Alexa" is a keyword that signals the user's intention to speak to the system through the base device.

When using the handheld device to interact with the system, the user presses the talk button during each user utterance:
Turn 1:
User: <PTT>"Set a timer."<ptt>
System: "For how long?"
Turn 2:
User: <PTT>"Thirty minutes."<ptt>
System: "Timer for thirty minutes starting now."
where <PTT> indicates pressing the talk button and <ptt> indicates releasing the talk button.

A speech dialog may also be performed using the base device for one turn and the handheld device for another turn:
Turn 1 (using the base device):
User: "Alexa, set a timer."
System: "For how long?"
Turn 2 (using the handheld device):
User: <PTT>"Thirty minutes."<ptt>
System: "Timer for thirty minutes starting now."
or
Turn 1 (using the handheld device):
User: <PTT>"Set a timer."<ptt>
System: "For how long?"
Turn 2 (using base device):
User: "Alexa, thirty minutes."
System: "Timer for thirty minutes starting now."

In some implementations, a first dialog turn may be initiated using the handheld device and the second dialog turn may be completed by speaking to the base device without the keyword:
Turn 1 (using handheld device):
User: <PTT>"Set a timer."<ptt>
System: "For how long?"
Turn 2 (using base device):
User: "Thirty minutes."
System: "Timer for thirty minutes starting now."
In this example, the system assumes that speech captured by the base device when the user does not press the talk button after the first turn is intended as dialog input.

A speech dialog may comprise any number of turns, each of which may use speech input from either the base device or the handheld device.

Figure 1:
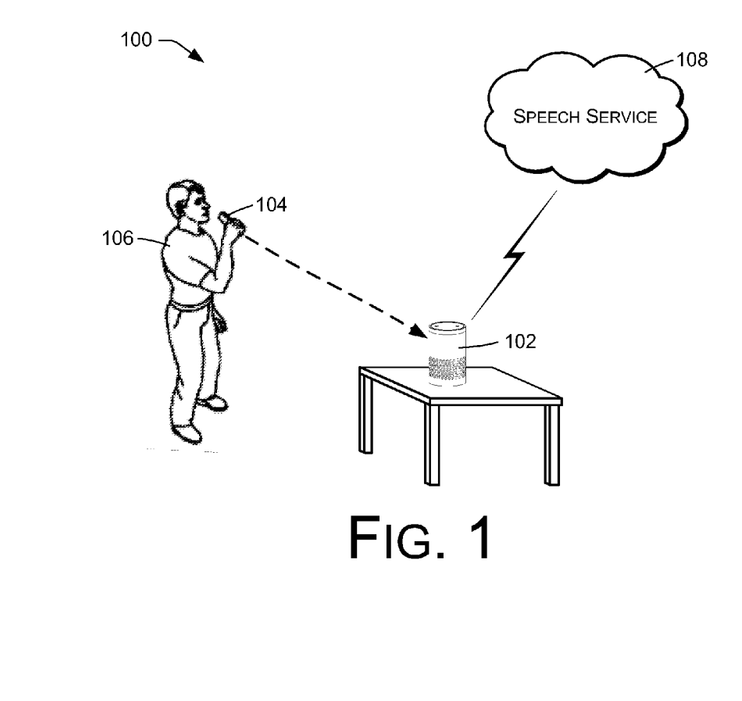
FIG. 1 shows an illustrative speech-based system that includes a base device, a handheld device, and a cloud-based speech service.

FIG. 1 shows an example speech-based system 100 having a base device 102 and a remote, handheld device 104. The system 100 may be implemented within an environment such as a room or an office, and a user 106 is shown as interacting with the system 100.

The base device 102 may in some embodiments comprise a network-based or network-accessible speech interface device having one or more microphones, a speaker, and a network interface or other communications interface. The base device 102 is designed to be stationary and to operate from a fixed location, such as being placed on a stationary surface. The base device 102 may have omnidirectional microphone coverage and may be configured to produce an audio signal in response to a user utterance of a keyword.

The handheld device 104 may comprise a remote controller configured to operate from a variable position relative to the base device 102. The handheld device 104 is battery operated and designed to be hand held. The handheld device 104 has a microphone that is held near and directed toward the mouth of the user 106. The handheld device 104 has a push-to-talk (PTT) actuator, also referred to herein as a talk button or a talk control. The handheld device 104 is configured to produce an audio signal in response to user actuation of a talk button.

The handheld device 104 may be configured to communicate with the base device 102 using a personal-area network (PAN) such as Bluetooth®. A user may speak into the handheld device 104 in order to issue spoken commands to the system 100.

The microphone of the handheld device 104 may be designed to be held near the mouth of the user 106 and to capture near-field sounds that originate from very near the microphone. The microphone of the handheld device 104 may also be directional in order to provide further rejection of non-voice sounds or interference originating from sources other than the mouth of the user.

The microphones of the base device 102, on the other hand, may be designed to capture far-field sounds originating from further distances, and may produce audio signals having relatively higher levels of non-voice interference than the audio signal generated by the handheld device 104. In some cases, the base device 102 may have a directional microphone or directional microphone array so that the sounds originating from the direction of the user 106 can be emphasized relative to other sounds.

Although the user 106 may speak into the base device 102 at any time, the user 106 may choose to use the handheld device 104 in certain situations such as when there is a high level of ambient or competing sound.

The speech-based system 100 may include a speech service 108 that receives real-time audio or speech information from the base device 102 and the handheld device 104 in order to recognize user speech, to determine the meanings and intents of the speech, and to perform actions or provide services in fulfillment of the meanings and intents. The speech service 108 may also generate and provide speech and other audio for playback by the base device 102.

The speech service 108 may in some instances be part of a network-accessible computing platform that is maintained and accessible via the Internet. Network-accessible computing platforms such as this may be referred to using terms such as "on-demand computing", "software as a service (SaaS)", "platform computing", "network-accessible platform", "cloud services", "data centers", and so forth. Communications between the base device 102 and the service 108 may be implemented through various types of data communications networks, including local-area networks, wide-area networks, and/or the public Internet. Cellular and/or other wireless data communications technologies may also be used for communications. The speech service 108 may serve a large number of base devices and associated handheld devices, which may be located in the premises of many different users.

The speech service 108 may be configured to interact with the user 106 through the base device 102 to determine a user intent and to provide a function or service in response to or in fulfillment of the user intent. Provided services may include performing actions or activities, rendering media, obtaining and/or providing information, providing information via generated or synthesized speech via the base device 102, initiating Internet-based services on behalf of the user 106, and so forth.

In FIG. 1, the user 106 is shown communicating with the speech service 108 by speaking into the handheld device 104. Alternatively, the user 106 may speak in the direction toward the base device 102 without using the handheld device 104. The speech service 108 may respond to input from either the handheld device 104 or the base device 102.

When using the handheld device 104 for speech input, the user presses a talk button on the handheld device 104 to indicate that he or she is making an utterance that is intended to be recognized and interpreted as a system query or command. When directing speech toward the base device 102, the user speaks a predefined keyword, also referred to as a wake word, to provide an alert that subsequent speech is directed to the system 100. A keyword may comprise a word that is reserved for use in this manner, and that does not often occur during normal user speech. More generally, speech directed to the base device may be prefaced by a trigger expression, which may include a keyword, a wake word, an expression, a phrase, or some other sound or utterance.

The system 100 may interact with the user 100 by engaging in a speech dialog with the user in order to determine and qualify an intent of the user. A speech dialog comprises multiple dialog turns, each of which comprises a user utterance and a system-generated speech reply. The user utterance of any given turn may be captured or provided by either the base device 102 or the handheld device 104. System generated speech is played by the speaker of the base device 102.

Functionally, one or more audio signals are provided from the base device 102 and/or the handheld device 104. When the user speaks through the base device 102, an audio signal containing the user speech is produced using one or more microphones of the base device 102 and the audio signal is provided to the speech service 108. When the user speaks through the handheld device 104, an audio signal containing the user speech is produced using one or more microphones of the handheld device 104 and the audio signal is provided to the base device 102. The base device 102 relays audio received from the handheld device 104 to the speech service 108.

The provided audio signals from the base device 102 and the handheld device 104 may be processed by the speech service 108 in various ways to understand user utterances. In response to a user utterance, the speech service 108 may generate a speech message and provide the speech message for playback by the base device 102. During each dialog turn, the speech service 108 performs automatic speech recognition (ASR) to recognize user speech represented by the received audio signal, performs natural language understanding (NLU) to determine a meaning of the user speech, and generates a speech reply for playback by the base device 102. Multiple dialog turns may be used to determine and fully qualify an intent of the user 106. At the end of the multiple turns of the speech dialog, the system 100 performs an action in fulfilment of the determined and qualified intent.

Although the speech service 108 is described in the preceding discussion as comprising a network-based service, the speech service 108 may alternatively be implemented as part of the base device 102. Furthermore, in some implementations the functionality attributed above to the speech service 108 may be distributed across different components such as the base device 102, the handheld device 104, one or more computer servers that are part of a network-based or network-accessible service, and/or any other associated or supporting devices.

Figure 2:
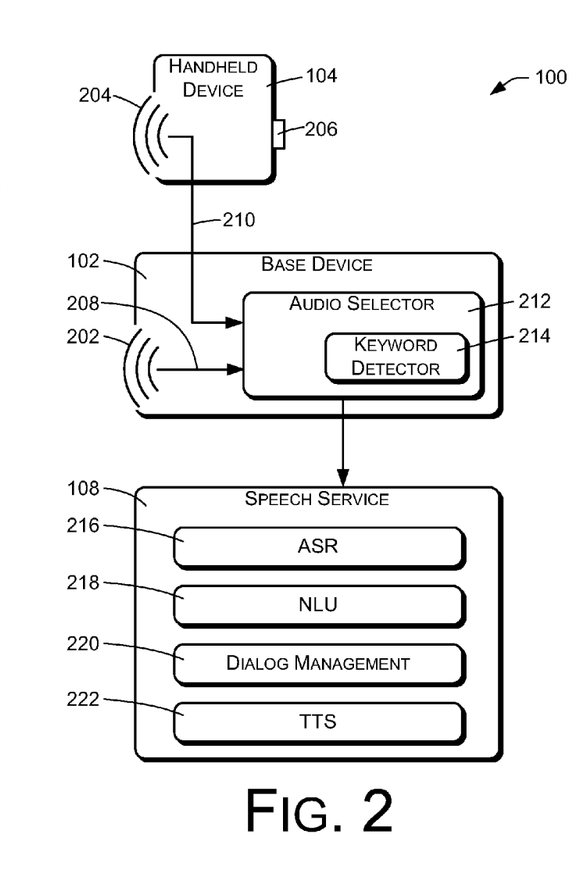
FIG. 2 is a block diagram showing relevant functional components of the speech-based system of FIG. 1.

FIG. 2 illustrates logical functionality of the system 100 in an example implementation. The base device 102 has a far-field microphone component 202 for capturing far-field audio containing user speech. In some cases, the microphone component 202 may comprise an array of multiple microphones suitable for use with directional beamforming and/or sound source localization, so that sounds originating from the direction of the user 106 may be selected and isolated.

The handheld device 104 has a near-field microphone 204 for capturing near-field audio containing user speech. In some cases, the microphone 204 may also be directional in order to emphasize sound coming from the direction of the user's mouth.

The handheld device 104 also has a talk control or actuator control 206, also referred to as a push-to-talk (PTT) button, that the user 106 may press or otherwise actuate to indicate that he or she is intending to speak into the microphone 204 of the handheld device 104. In some cases, the handheld device 104 may have other buttons or user interface elements, such as a keypad containing number keys, media control keys, content navigation keys, and so forth.

The base device 202 produces a base device audio signal 208 using the microphone component 202. The base device 102 may have audio processing components (not shown) for processing and/or producing the audio signal 208. For example, such audio processing components may perform echo cancellation, beamforming, noise filtering, and other functions. In some embodiments the base device audio signal 208 may comprise a directional signal produced by audio beamforming techniques to emphasize sound from a selected direction, such as the direction of the user 106 relative to the base device 102.

The handheld device 204 provides a remote device audio signal 210 to the base device 102 when the talk control 206 is pressed, using Bluetooth® or another device-to-device communications protocol. The remote device audio signal 210 is received by the base device 102 and provided or relayed to the speech service 108. In certain embodiments, the remote device audio signal 210 may be provided directly to the speech service 108 from the handheld device 104 using available network communications, without going through the base device 102. The handheld device 104 and/or the base device 102 may have audio processing components (not shown) for processing the remote device audio signal 210.

The base device 102 has an audio selector 212 that selects and provides either the base device audio signal 208 or the remote device audio signal 210 to the speech service 108, depending on whether the user is directing speech to the base device 102 or the handheld device 104. For example, the base device audio signal 210 may be provided to the speech service 108 after an utterance of a preconfigured keyword or wake word is detected by the base device 102 as having been spoken by the user 106. The base device 102 may have a keyword detector 214 to analyze the base device audio signal 208 and to perform keyword detection.

The keyword detector 214 may be implemented using keyword spotting technology. A keyword spotter is a functional component or algorithm that evaluates an audio signal to detect the presence a predefined word or expression in the audio signal. Generally, a keyword spotter uses simplified ASR techniques to detect a specific word or a limited number of words rather than attempting to recognize a large vocabulary. For example, a keyword spotter may provide a notification when a specified word is detected in an audio signal, rather than providing a textual or word-based output. A keyword spotter using these techniques may compare different words based on hidden Markov models (HMMs), which represent words as series of states. Generally, an utterance is analyzed by comparing its model to a keyword model and to a background model. Comparing the model of the utterance with the keyword model yields a score that represents the likelihood that the utterance corresponds to the keyword. Comparing the model of the utterance with the background model yields a score that represents the likelihood that the utterance corresponds to a generic word other than the keyword. The two scores can be compared to determine whether the keyword was uttered.

The remote device audio signal 210 may be provided to the speech service 108 during times when the talk control 206 is pressed by the user 106. When providing one or the other of the base device audio signal 208 or the remote device audio signal 210, the base device 102 may provide an indication to the speech service 108 regarding which of the audio signals is being provided.

The speech service 108 may have an automatic speech recognition (ASR) component 216 that recognizes human speech in the audio signal produced by the base device 102 and/or the handheld device 104. For example, large vocabulary speech recognition techniques may be used, such as techniques using hidden Markov models and Gaussian mixture models, to provide a continuous word stream corresponding to the speech represented by an audio signal.

The speech service 108 may also have a natural language understanding (NLU) component 218 that determines the meaning or intent of user speech that is recognized by the ASR component 216.

The speech service 108 may also have a dialog management component 220 configured to coordinate speech dialogs or interactions with the user 106. Speech dialogs may be used to determine or clarify user intents by asking the user 106 for information using speech prompts, also referred to herein as speech replies or speech messages.

The speech service 108 may further include a text-to-speech (TTS) component 222 that synthesizes or otherwise produces speech audio under the control of the dialog management component 220. For example, the TTS component 222 may produce speech to be played on the speaker of the base device 102.

Figure 3:
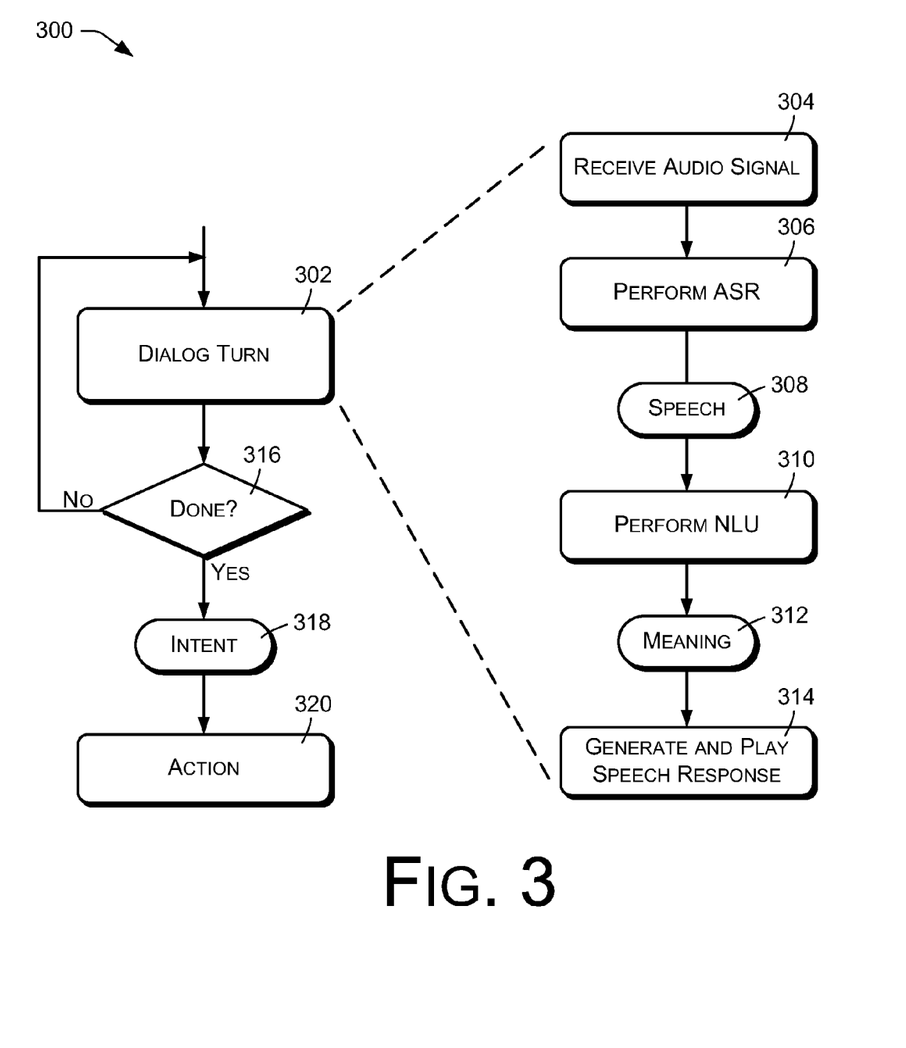
FIG. 3 a flow diagram illustrating an example method of performing a speech dialog that includes one or more dialog turns.

FIG. 3 illustrates a method 300 of engaging in a speech dialog such as may be used in the system described above. The speech dialog comprises multiple dialog turns 302. Generally, the speech dialog 300 engages in a number of dialog turns 302 that is sufficient to determine the intent of the user 106, so that the system 100 can take an action in response to the intent.

Engaging in an individual dialog turn 302 comprises an act 304 of receiving an audio signal representing user speech. The audio signal may be produced by the handheld device 104 during a time period while the talk control is actuated or by the base device 102 in response to detecting the keyword.

Engaging in the dialog turn 302 further comprises an act 306 of analyzing the received audio signal by performing automatic speech recognition (ASR) to recognize user speech 308 in the audio signal and to produce a textual transcription of the user speech.

Engaging in the dialog turn 302 further comprises an act 310 of determining a meaning 312 of the speech 308 by performing natural language recognition (NLU) on the recognized speech 308. The meaning 312 may comprise a partial intent or an intent that is not sufficiently qualified to determine which of multiple available actions should be performed. For example, the meaning might indicate "play music" but not indicate which music to play.

Engaging in the dialog turn 302 may also comprise an act 314 of generating and directing the base device 102 to play the speech response. The speech response may query the user for more information or may inform the user regarding the result of the dialog such as an action taken in fulfillment of a user intent. Note that the act 314 may sometimes be omitted, particularly in the last turn of a dialog.

After each dialog turn 302, an act 316 comprises determining whether an intent 318 has been fully defined or qualified by speech received from the user 106. The intent 318 is considered to be fully defined or qualified when it is sufficiently detailed to allow the system 100 to perform an action in fulfilment of the intent.

If the intent 318 is not yet fully defined or qualified, the act 302 is repeated to engage the user in another dialog turn. The act 302 is repeated until the intent 318 is fully defined and qualified.

If the intent 318 has been fully defined and qualified, an act 320 is performed of initiating or performing an action in fulfillment of or in response to the user intent 316. For example, the act 318 may comprise playing specified music, speaking the current time, ordering specified goods, adding a specified item to a list, etc.

Figure 4:
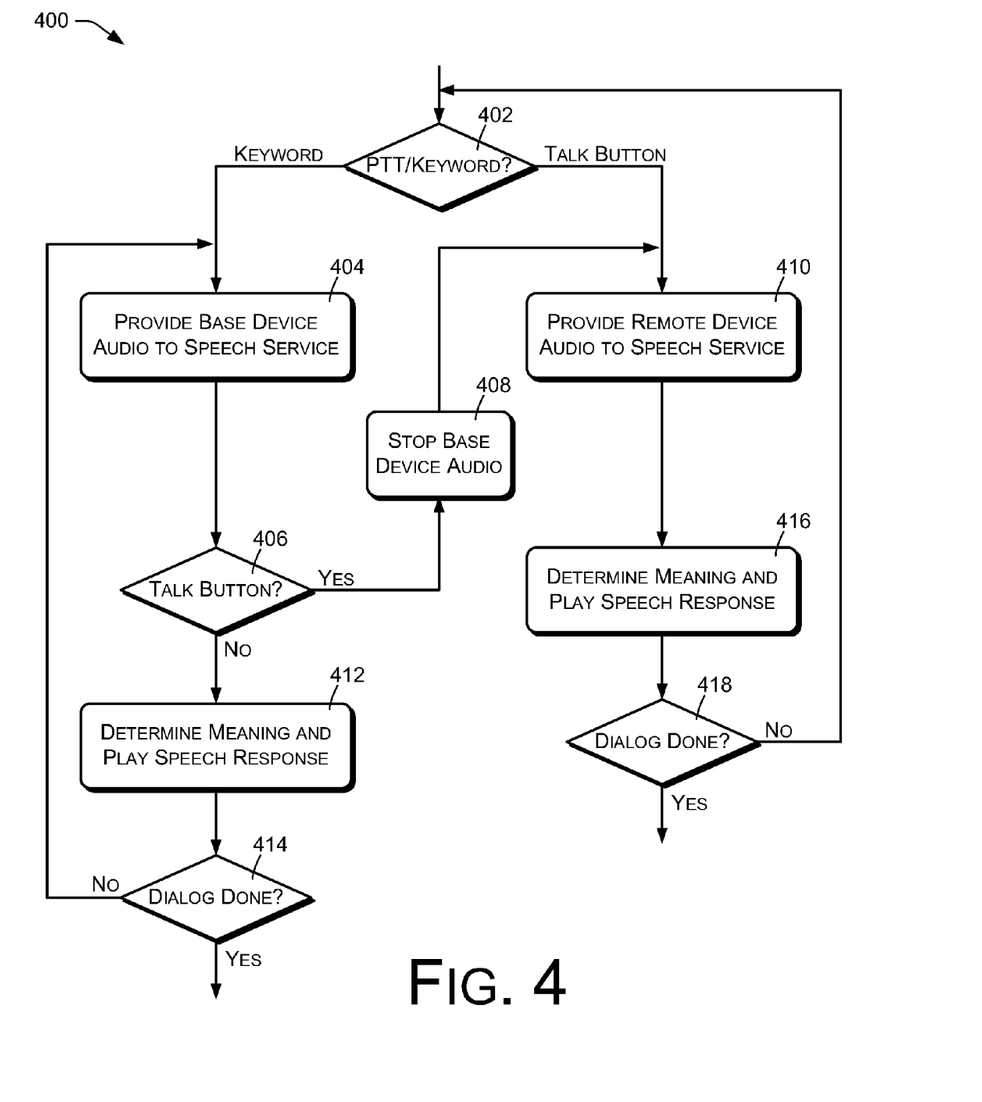
FIG. 4 is a flow diagram illustrating a more detailed example method of performing a speech dialog that includes one or more dialog turns.

FIG. 4 illustrates an example method 400 showing additional details regarding a speech dialog that is conducted based on audio signals that may be provided by or received from the base device 102 and/or the handheld device 104. FIG. 4 illustrates how each turn of a speech dialog may be conducted based on an audio signal produced by the base device 102 or an audio signal produced by the handheld device 104. In this embodiment, a dialog turn is initiated by either actuating the talk control or by speaking the keyword. Subsequent dialog turns may also be initiated by actuating the talk control or by speaking the keyword. When an initial dialog turn is initiated by directing speech toward the base device 102 after speaking the keyword, however, a subsequent dialog turn may be based on speech directed to the base device 102 without further utterance of the keyword.

An act 402 comprises detecting a user utterance of a keyword or a user actuation of a talk control. In the described embodiment, the base device 102 detects a keyword utterance by analyzing the base device audio signal 208 produced by the microphone component 202 of the base device 102. The base device 102 may detect actuation of the talk control 206 of the handheld device 104 by receiving a control signal from the handheld device 104 and/or by receiving the remote device audio signal 210 from the handheld device.

If the keyword is detected in the act 402, an act 404 is performed of providing the base device audio signal 208 to the speech service 108. The speech service 108 may buffer the audio signal over the duration of a user utterance and/or may begin ASR on a partially received user utterance.

While providing the base device audio signal 208 to the speech service 108, an act 406 comprises determining whether the talk control 206 of the handheld device 104 has been actuated. If the talk control 206 has been actuated, an act 408 is performed of stopping the providing of the base device audio signal 208 and instead performing an act 410 of providing the remote audio device signal 210 to the speech service 208. Subsequent speech recognition by the speech service 208 may be based solely on the audio signal produced by the handheld device 104 or may be based on a concatenation of the audio initially produced by the base device 102 and the audio subsequently produced by the handheld device 104 after actuation of the talk control 206.

If actuation of the talk control is not detected in the act 406, a further act 412 is performed of analyzing the remote device audio signal 210 to determine its meaning. This may include both ASR and NLU, performed by the ASR component 216 and the NLU component 218, respectively. The act 412 may further comprise determining and playing a system speech response in order to solicit further input from the user 106. The speech response may be generated by the dialog management component 210, which may also instruct or direct the base device 102 to play the speech response. The speech response may be provided to the base device 102 as text or as audio generated by the TTS component 222. In some situations, such as at the end of a dialog, the speech response may indicate or describe the action that is being performed or that will be performed in response to the current speech dialog.

An act 414 comprises determining whether the speech dialog is done, which is the case when enough details regarding the user intent have been received through multiple dialog turns to act upon the user intent. If the dialog is not done, the act 404 is repeated to initiate an additional dialog turn based on audio received from the base device 102. If the dialog is done, the speech service 108 and/or the base device 102 implement an action corresponding to the determined user intent.

Returning to the top of FIG. 4, if actuation of the talk control 206 is detected in the act 402, the act 410 is performed of providing the remote audio device signal 210 to the speech service 208. The speech service 108 may buffer the received audio signal over the duration of a user utterance and/or may begin ASR on a partially received user utterance.

Following the act 410, an act 416 is performed of analyzing the handheld device audio signal 210 to determine its meaning. This may include both ASR and NLU, performed by the ASR component 216 and the NLU component 218, respectively. The act 416 may further comprise determining and playing a system speech response in order to solicit further input from the user 106. The speech response may be generated by the dialog management component 210, which may also instruct or direct the base device 102 to play the speech response. The speech response may be provided to the base device 102 as text or as audio generated by the TTS component 222. In some situations, such as at the end of a dialog, the speech response may indicate or describe the action that is being performed or that will be performed in response to the current speech dialog.

An act 418 comprises determining whether the speech dialog is done, which is the case when enough details regarding the user intent have been received through multiple dialog turns to act upon the user intent. If the dialog is not done, the method 400 is repeated starting from the act 402 to perform additional dialog turns. If the dialog is done, the speech service 108 and/or the base device 102 implement an action corresponding to the determined user intent.

The method 400 allows a pair of consecutive dialog turns to be completed in several different ways, as in the following examples:

Example 1

Turn A uses speech from handheld device during talk control actuation.
Subsequent turn B uses speech from handheld device during talk control actuation.

Example 2

Turn A uses speech from base device after keyword detection.
Subsequent turn B uses speech from base device, without further keyword detection.

Example 3

Turn A uses speech from base device after keyword detection.
Subsequent turn B uses speech from handheld device during talk control actuation.

Example 4

Turn A uses speech from handheld device during talk control actuation.
Subsequent turn B uses speech from base device after keyword detection.

Example 5

Turn A begins after keyword detection using speech from base device; talk control is actuated and turn A continues using speech from handheld device.

The method 400 may be iterated multiple times in order to perform two, three, or more dialog turns. Note that after any turn is completed using speech from the base device, a further keyword utterance is not required of the user in order to continue the speech dialog after the action 412 of determining the meaning of the recognized user speech and playing a speech response to the user speech. Rather, the system assumes that speech in this situation will continue to be directed to the base device and automatically provides a subsequent audio signal from the base device after the previous dialog turn, without further user utterance of the keyword. This assumption may be overridden as shown in FIG. 4 by the action 406 of detecting actuation of the talk control. In some cases, the action 406 produces a "yes" result only if the talk control is actuated within a predefined time period after playing the speech response of a previous dialog turn. Accordingly, a subsequent audio signal provided to the speech service 108 may be produced and provided by the base device if the predefined time period elapses without a new actuation of the talk control, while subsequent audio signal may be produced and provided by the handheld device in response to a new actuation of the talk control within the predefined time period.

Figure 5:
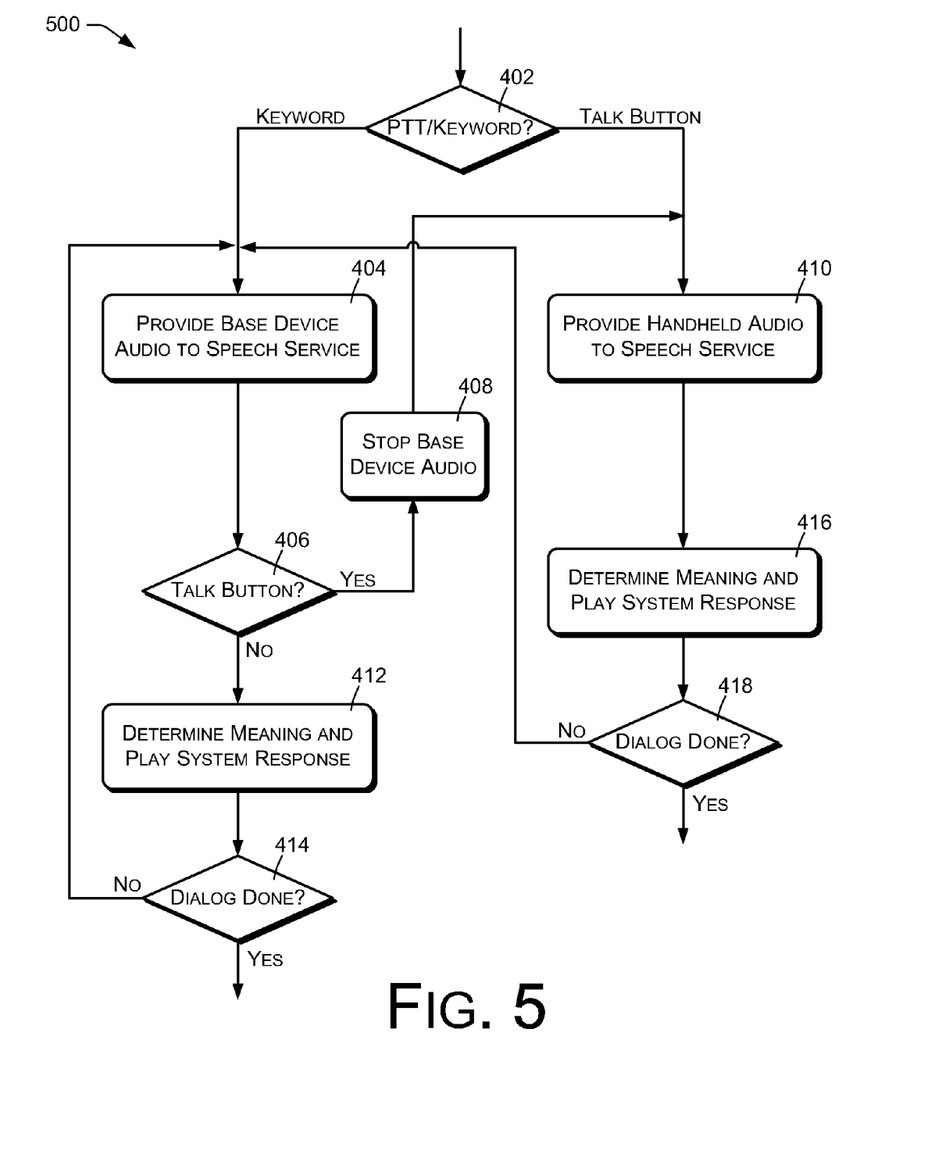
FIG. 5 is a flow diagram illustrating an alternative method of performing a speech dialog that includes one or more dialog turns.

FIG. 5 illustrates an alternative method 500 of conducting a speech dialog. The method 500 is the same as the method 400 except for a difference in handling a dialog turn that is subsequent to a dialog turn that uses speech from the handheld device. Specifically, when the result of the act 418 is "no," indicating that the speech dialog is not done after completing a turn using speech from the handheld device, the method 500 is directed back to the act 404 of providing speech audio from the base device 102 to the speech service.

In FIG. 4, a turn subsequent to a handheld-based turn is initiated by actuating the PTT button or uttering the keyword. In FIG. 5, the system may initiate such a subsequent turn automatically by providing speech from the base device without utterance by the user of the keyword. The speech service 108 may buffer the base device audio signal 208 for a predefined time period. If the predefined time elapses without actuation of the talk control, the buffered audio signal is provided to the speech service and the speech service performs the subsequent turn using the base device audio signal 208. However, if a talk control actuation is detected within the predefined time period, the act 410 is performed and the speech service performs the subsequent turn using the received remote device audio signal 210. In this case, the buffered signal from the base device may be discarded.

Figure 6:
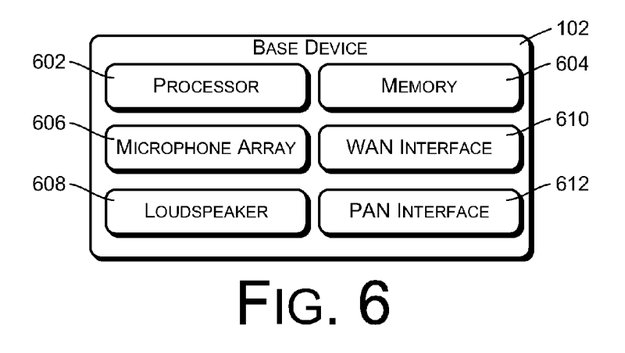
FIG. 6 is a block diagram showing relevant functional components of a base device.

FIG. 6 illustrates relevant components and logical functionality of an example base device 102. The example base device 102 has a processor 602 and memory 604. The processor 602 may include multiple processors, a processor having multiple cores, one or more digital signal processors (DSPs), and/or other types of processing components. The memory 604 may contain applications and programs in the form of instructions that are executed by the processor 602 to perform acts that implement logical functionality of the base device 102. The memory 604 may be a type of non-transitory computer storage media and may include volatile and nonvolatile memory. Thus, the memory 604 may include, but is not limited to, RAM, ROM, EEPROM, flash memory, or other memory technology.

The base device 102 may have a microphone array 606 and a loudspeaker 608. The microphone array 606 may have multiple microphones or microphone elements that are spaced from each other for use in sound source localization and/or beamforming. The loudspeaker 608 may be used for producing sound within the user environment, which may include generated or synthesized speech.

The base device 102 may have a wide-area communications interface 610 configured to communicate with the speech service 108. The wide-area communications interface 610 may comprise wide-area network (WAN) interface such as an Ethernet or Wi-Fi® interface. The wide-area communications interface 610 may be configured to communicate with the speech service 108 through a public network such as the Internet.

The base device 102 may also have a personal-area network (PAN) communications interface 612 such as a Bluetooth® interface or other wireless device-to-device peripheral interface. The PAN interface 612 may be configured to receive a remote audio signal from the handheld device 104, wherein the remote audio signal contains speech utterances of the user 106 as captured by a microphone of the handheld device 104.

Figure 7:
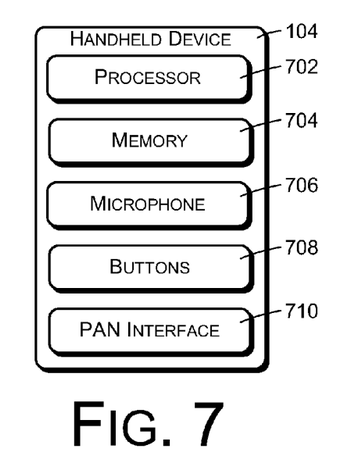
FIG. 7 is a block diagram showing relevant functional components of a handheld device.

FIG. 7 illustrates examples of relevant logical or functional components of the handheld device 104. The handheld device may comprise a processor 702 and memory 704. The memory 704 may contain applications and programs in the form of instructions that are executed by the processor 702 to perform acts that implement logical functionality of the handheld device 104. The memory 704 may be a type of non-transitory computer storage media and may include volatile and nonvolatile memory. Thus, the memory 704 may include, but is not limited to, RAM, ROM, EEPROM, flash memory, or other memory technology.

The handheld device 104 may have a microphone 706 that can be held near the mouth of a user to capture user utterances and speech. The microphone 706 generates a remote audio signal that is provided to the base device 102. The remote audio signal contains utterances of the user captured or received by the remote microphone 706.

The handheld device 104 may have one or more buttons or keys 708, such as media control buttons for example. The buttons 708 may include a talk button or other control that the user presses when speaking into the handheld device 104. The talk control may be used as an indication that the handheld device is to capture audio using the remote microphone 706 and to stream or otherwise provide the audio to the base device 102.

The handheld device 104 may also have a personal-area network (PAN) interface 710 such as a Bluetooth® interface or other wireless device-to-device peripheral interface. The PAN interface 710 may be configured to provide an audio signal to the base device 102 by means of the PAN interface 612 of the base device, wherein the audio signal contains speech utterances of the user 106.

Both the base device 102 and the handheld device 104 may have other components, including other hardware and software components, that are not shown in FIGS. 6 and 7.

Figure 8:
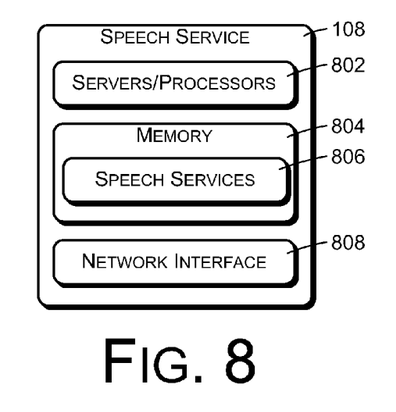
FIG. 8 is a block diagram showing relevant functional components of a speech service.

FIG. 8 illustrates examples of relevant logical or functional components of the speech service 108. The speech service 108 includes operational or control logic, which may comprise one or more servers, computers, and/or processors 802. The control logic includes memory 804 containing applications, programs, and/or other software in the form of instructions that are executed by the servers or processor 802 to perform acts that implement desired functionality of the speech service 108, including the functionality described herein. The memory 804 may be a type of non-transitory computer-readable storage media and may include volatile and nonvolatile memory. Thus, the memory 804 may include, but is not limited to, RAM, ROM, EEPROM, flash memory, magnetic media, optical media, or other memory technology. The memory 804 may also include media commonly used for transferring or distributing software, such as CD-ROMs, DVDs, flash drives, memory sticks, etc.

Among other logical and physical components not specifically shown, software of the speech service 108 may include speech services 806, which may include ASR, NLU, dialog management, and text-to-speech conversion as described above. Servers of the speech service 108 may also have network interfaces 808 for communicating with multiple base devices 102 and handheld devices 104.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    a handheld remote control having a first microphone and a talk button, the handheld remote control being configured to produce a first audio signal using the first microphone in response to a first actuation of the talk button, wherein the first audio signal represents first user speech associated with a user;
    a stationary base device having a second microphone, the stationary base device being configured to produce a second audio signal using the second microphone in response to an utterance of a keyword, wherein the second audio signal represents second user speech associated with the user that follows the utterance of the keyword;
    wherein the stationary base device is further configured to receive the first audio signal from the handheld remote control;
    a speech service configured to receive the first audio signal and the second audio signal from the stationary base device and to engage in a speech dialog with the user to determine an intent of the user, wherein engaging in the speech dialog comprises engaging in a first dialog turn and a second dialog turn with the user;
    the speech service being further configured to cause an action to be performed in fulfillment of the intent of the user;
    wherein engaging in the first dialog turn comprises:
        analyzing the first audio signal to recognize the first user speech;
        determining a first meaning of the first user speech;
        generating a first speech response to the first user speech; and
        directing the stationary base device to play the first speech response; and
    wherein engaging in the second dialog turn comprises:
        analyzing the second audio signal to recognize the second user speech;
        determining a second meaning of the second user speech;
        generating a second speech response to the second user speech; and
        directing the stationary base device to play the second speech response.

2. The system of claim 1, wherein:
    the stationary base device is further configured to produce a third audio signal using the second microphone after engaging in the second dialog turn without further utterance of the keyword, the third audio signal representing third user speech;
    engaging in the speech dialog further comprises engaging in a third dialog turn with the user, wherein engaging in the third dialog turn comprises:
        analyzing the third audio signal to recognize the third user speech;
        determining a third meaning of the third user speech;
        generating a third speech response to the third user speech; and
        directing the stationary base device to play the third speech response.

3. The system of claim 1, wherein:
    the stationary base device is further configured to provide a third audio signal to the speech service after engaging in the second dialog turn;
    the stationary base device receives the third audio signal from the handheld remote control in response to a second actuation of the talk button within a predefined time period after engaging in the second dialog turn;
    the stationary base device produces the third audio signal using the second microphone of the stationary base device in response to the predefined time period elapsing without actuation of the talk button;
    engaging in the speech dialog further comprises engaging in a third dialog turn with the user, wherein engaging in the third dialog turn comprises:
        analyzing the third audio signal to recognize third user speech;

determining a third meaning of the third user speech;
generating a third speech response to the third user speech; and
directing the stationary base device to play the third speech response.

4. A method comprising:
engaging in a speech dialog with a user to determine an intent of the user, wherein engaging in the speech dialog comprises engaging in a first dialog turn and, a second dialog turn, and a third dialog turn with the user;
wherein engaging in the first dialog turn comprises:
receiving a first audio signal produced by a first device, the first audio signal representing first user speech; and
determining, based at least in part on providing the first audio signal to a speech service, a first meaning of the first user speech;
wherein engaging in the second dialog turn comprises:
receiving a second audio signal that is produced using a microphone of a second device, the second audio signal representing second user speech; and
determining, based at least in part on providing the second audio signal to the speech service, a second meaning of the second user speech based; and
wherein engaging in the third dialog turn comprises:
receiving, based at least in part on an actuation of a talk control of the first device within a predefined time period after engaging in the second dialog turn, a third audio signal from the first device, the third audio signal representing third user speech; and
determining a third meaning of the third user speech.

5. The method of claim 4, further comprising:
generating a response to at least one of the first user speech, the second user speech, or the third user speech, wherein the response queries the user regarding the intent of the user.

6. The method of claim 4, further comprising:
producing, based at least in part on actuation of the talk control, the first audio signal; and
producing, based at least in part on an utterance of a trigger expression, the second audio signal.

7. The method of claim 4, further comprising:
analyzing the first audio signal to recognize the first user speech; and
analyzing the second audio signal to recognize the second user speech.

8. The method of claim 4, wherein receiving the first audio signal comprises receiving the first audio signal from the second device.

9. A method comprising:
engaging in a speech dialog to determine an intent of a user, wherein engaging in the speech dialog comprises engaging in a first dialog turn and a second dialog turn;
wherein engaging in the first dialog turn comprises:
determining an actuation of a talk control associated with a first device;
receiving a first audio signal produced by the first device, wherein the first audio signal represents first user speech; and
determining a first meaning of the first user speech;
wherein engaging in the second dialog turn comprises:
receiving, after engaging in the first dialog turn, a second audio signal representing second user speech, the second audio signal produced using a microphone of a second device; and
determining a second meaning based at least in part on:
receiving a third audio signal produced by the first device based at least in part on an actuation of the talk control of the first device within a predefined time period after the first dialog turn, the third audio signal representing third user speech; or
receiving the second audio signal based at least in part on the predefined time period elapsing without actuation of the talk control.

10. The method of claim 9, further comprising:
generating an output to at least one of the first user speech, the second user speech, or the third user speech, the output corresponding to a query regarding the intent of the user.

11. The method of claim 9, further comprising:
buffering the second audio signal for at least the predefined time period;
determining that the predefined time period has elapsed without actuation of the talk control; and
providing the second audio signal to a speech service.

12. The method of claim 9, further comprising:
providing the second audio signal to a speech service during the predefined time period.

13. The method of claim 9, wherein:
determining the first meaning comprises providing the first audio signal to a speech service; and
determining the second meaning comprises providing at least one of the second audio signal or the third audio signal to the speech service.

14. The method of claim 9, further comprising:
producing the second audio signal without user utterance of a keyword.

15. The method of claim 9, wherein receiving the first audio signal comprises receiving the first audio signal from the second device.

16. The method of claim 4, wherein, based at least in part on the first dialogue turn and the second dialogue turn, the speech service is configured to cause an action to be performed to fulfill the intent of the user.

17. A method comprising:
engaging in a speech dialog with a user to determine an intent of the user, wherein engaging in the speech dialog comprises engaging in a first dialog turn, a second dialog turn, and a third dialog turn with the user
wherein engaging in the first dialog turn comprises:
receiving a first audio signal produced by a first device, the first audio signal representing first user speech; and
determining, based at least in part on providing the first audio signal to a speech service, a first meaning of the first user speech;
wherein engaging in the second dialog turn comprises:
receiving a second audio signal produced using a microphone of a second device, the second audio signal representing second user speech;
determining, based at least in part on providing the second audio signal to the speech service, a second meaning of the second user speech; and
wherein engaging in the third dialog turn comprises:
receiving, based at least in part on a predefined time period elapsing after engaging in the second dialog turn without actuation of a talk control of the first device, a third audio signal from the second device, the third audio signal representing third user speech; and
determining a third meaning of the third user speech.

18. The method of claim 17, further comprising:
generating a response to at least one of the first user speech, the second user speech, or the third user speech, wherein the response queries the user regarding the intent of the user.

19. The method of claim 17, further comprising:
producing, based at least in part on an actuation of the talk control, the first audio signal; and
producing, based at least in part on an utterance of a trigger expression, the second audio signal.

20. The method of claim 17, further comprising:
analyzing the first audio signal to recognize the first user speech; and
analyzing the second audio signal to recognize the second user speech.

21. The method of claim 17, wherein receiving the first audio signal comprises receiving the first audio signal from the second device.

22. The method of claim 19, wherein engaging in the third dialog turn further comprises:
producing the third audio signal after engaging in the second dialog turn without further utterance of the trigger expression.

\* \* \* \* \*